United States Patent [19]

Sezaki et al.

[11] Patent Number: 4,879,055

[45] Date of Patent: Nov. 7, 1989

[54] SOFT MAGNETIC MATERIAL COMPOSITION AND MOLDING PROCESS THEREFOR

[75] Inventors: Koji Sezaki; Koichi Nagai; Takashi Sakauchi, all of Ohtsu, Japan

[73] Assignee: Kanegafuchi Kagaku Kogyo Kabushiki Kaisha, Osaka, Japan

[21] Appl. No.: 298,226

[22] Filed: Jan. 17, 1989

Related U.S. Application Data

[63] Continuation of Ser. No. 934,633, Filed as PCT JP86/00189 on Apr. 16, 1986, Published as WO86/06541 on Nov. 6, 1986, abandoned.

[30] Foreign Application Priority Data

Apr. 19, 1985 [JP] Japan .................................. 60-85110

[51] Int. Cl.$^4$ .......................... C04B 35/04; H01F 1/00; H01F 1/26
[52] U.S. Cl. ................................ 252/62.54; 335/303; 264/DIG. 58
[58] Field of Search .......................... 252/62.54, 62.53; 335/303; 264/DIG. 58

[56] References Cited

U.S. PATENT DOCUMENTS

| | | | |
|---|---|---|---|
| 2,563,520 | 8/1951 | Faus | 252/62.54 |
| 3,067,140 | 12/1962 | Davis, Jr. | 252/62.54 |
| 3,668,176 | 6/1972 | Childress | 252/62.54 |
| 4,200,547 | 4/1980 | Beck | 252/62.54 |
| 4,267,203 | 5/1981 | Motz et al. | 252/62.54 |
| 4,308,155 | 12/1981 | Tada et al. | 252/62.54 |
| 4,320,080 | 3/1982 | Esper et al. | 252/62.54 |
| 4,327,346 | 4/1982 | Tada et al. | 252/62.54 |
| 4,431,979 | 2/1984 | Stijntjes | 252/62.54 |
| 4,444,670 | 4/1984 | Moslener | 252/62.54 |
| 4,462,919 | 7/1984 | Saito et al. | 252/62.54 |
| 4,526,837 | 7/1985 | Ohtsuki et al. | 252/62.54 |
| 4,547,419 | 10/1985 | Nishimatsu et al. | 252/62.54 |
| 4,559,265 | 12/1985 | Kubota et al. | 252/62.54 |
| 4,620,933 | 11/1986 | Ochiai et al. | 252/62.54 |

FOREIGN PATENT DOCUMENTS

51-28356 8/1976 Japan .
60-235412 11/1985 Japan .

OTHER PUBLICATIONS

Kirk-Othmer, "Encyclopedia of Chemical Technology", Third Ed. vol. 18, (1982), pp. 113-171.

*Primary Examiner*—John F. Niebling
*Assistant Examiner*—Steven P. Marquis
*Attorney, Agent, or Firm*—Armstrong, Nikaido, Marmelstein, Kubovcik & Murray

[57] ABSTRACT

There is provided a soft magnetic material composition comprising 70 to 95 vol % of soft magnetic material powder, with the balance being a liquid thermosetting resin. The composition has a high density and initial permeability. According to the process of this invention, the composition can be efficiently made into molded products of high permeability having a high strength and dimensional accuracy.

4 Claims, No Drawings

SOFT MAGNETIC MATERIAL COMPOSITION AND MOLDING PROCESS THEREFOR

This application is a continuation of application Ser. No. 934,633 filed as PCT JP86/00189 on Apr. 16, 1986, published as WO86/06541 on Nov. 6, 1986, now abandoned.

DESCRIPTION

1. Technical Field

The present invention relates to a composition having good moldability and permeability which is composed of a soft magnetic material and a liquid thermosetting resin as a binder, and to a molding process therefor.

2. Background Art

Heretofore, the soft magnetic material used for magnetic cores has been dominated by sintered moldings of spinel ferrite (e.g., Mn-Zn ferrite and Ni-Zn ferrite) which have a low loss at the high-frequency region. Since they are produced by powder metallurgy, they are poor in dimensional accuracy due to shrinkage that takes place at the time of sintering and they cannot be made in complex shape with ease. They have an additional disadvantage of being poor in impact strength which is inherent in sintered products. In order to eliminate these disadvantages, there has been proposed the so-called plastics soft magnetic material formed by bonding a soft magnetic material with a synthetic resin. For example, there is disclosed in Japanese Patent Publication No. 28356/1976 a composition composed of a spinel ferrite having a particle diameter in a specific range and a solid powdery thermosetting resin. The magnetic core formed from such a plastics soft magnetic material is inferior in saturation magnetization and permeability to sintered products, because it contains a synthetic resin as a binder which is a non-magnetic substance. If the magnetic core of the plastics soft magnetic material is to be improved in its magnetic properties, it is necessary to increase the content of the soft magnetic material powder and also to increase the molding pressure, whereby reducing the void ratio and increasing the filling density of the soft magnetic material powder.

Increasing the content of the soft magnetic material powder poses a problem in that the conventional plastics soft magnetic material is easily damaged and deformed before it is cured and solidified and that the molded item after curing is poor in mechanical strength. Also, increasing the molding pressure to reduce the void ratio breaks the particles of the soft magnetic material, deteriorating the magnetic properties of the magnetic core. In addition, increased molding pressure is liable to cause damage to the mold.

In order to solve the above-mentioned problems, the present inventors carried out a series of researches on the method of increasing the density of the molding, whereby improving the magnetic properties of the molding, while reducing the molding pressure on the mold, and also on the method of increasing the green strength of the molding before curing, whereby preventing the damage and deformation and achieving good dimensional accuracy. The present invention is based on the results of the researches.

DISCLOSURE OF THE INVENTION

The present invention covers, in the first place, a soft magnetic material composition comprising 70 to 95 vol% of soft magnetic material powder, with the balance being a liquid thermosetting resin, preferably containing a plasticizer, and, in the second place, a process for molding a plastics-containing soft magnetic material composition having high permeability, said process comprising compression molding at normal temperature a soft magnetic material composition comprising 70 to 95 vol% of soft magnetic material powder, with the balance being a liquid thermosetting resin, and subsequently heat-curing and solidifying the molded item at a temperature at which the liquid thermosetting resin cures.

The soft magnetic material powder used in this invention includes spinel ferrite such as Mn-Zn ferrite, Ni-Zn ferrite, and Mn-Mg ferrite, formed by sintering at 1100° to 1300° C. and subsequent crushing, and also soft magnetic alloy powder such as iron powder, Fe-Ni alloy powder, Fe-Al-Si alloy powder, and amorphous soft magnetic alloy powder. They are used individually or in combination with one another. Preferable among them is spinel ferrite powder which is commercially available. The soft magnetic material powder should have a specific particle size distribution so that it shows good magnetic properties. That is, the minimum particle size should be 0.1 mm, more desirably 0.3 mm, and the maximum particle size should be equal to the thickness of the thinnest part of the desired molding.

Examples of the liquid thermosetting resin used in this invention include phenolic resin, epoxy resin, urea resin, melamine resin, furan resin, and unsaturated polyester resin. Preferable among them is phenolic resin, especially resol-type phenolic resin. A liquid thermosetting resin as a binder is superior to a solid powdery resin in miscibility with the soft magnetic material powder. In addition, it provides a compression-molded item having a high green strength and resistance to damage and deformation owing to its adhesive force, and it cures into moldings of high strength.

The composition of this invention contains 70 to 95 vol% of soft magnetic material powder, with the balance being a liquid thermosetting resin. With the amount of soft magnetic material powder being less than 70 vol%, the resulting molding does not show the desired magnetic properties, and with the amount in excess of 95 vol%, the resulting molding is liable to damage and deformation.

The above-mentioned liquid thermosetting resin can be used alone as a binder to yield the desired composition. It may be incorporated with a plasticizer where a better composition is required. A plasticizer lowers the viscosity of the binder, whereby permitting the uniform distribution of the soft magnetic powder and reducing friction between soft magnetic powders at the time of compression molding. This leads to a high filling density and the improvement in initial permeability. In addition, a binder containing a plasticizer permits the compression molding at a comparatively low pressure without sacrificing the density and initial permeability of the molded product. Thus the mold is relieved from load.

The plasticizer used in this invention includes polyester-based plasticizer, phthalic ester-based plasticizer, epoxidized oil-based plasticizer, fatty acid ester-based plasticizer, etc. Their selection depends on the type of liquid thermosetting resin used. Preferred plasticizers for a phenolic resin are polyester of adipic acid, polyester of phthalic acid, dibutyl phthalate, and epoxidized soybean oil. The preferred amount of the plasticizer is 5 to 100 parts by weight for 100 parts by weight of solids in the liquid thermosetting resin. An extremely small amount of plasticizer does not produce the desired effect; and an excessive amount of plasticizer greater than the amount of solids in the liquid thermosetting resin lowers the mechanical strength of the molding.

The composition of this invention may be incorporated with a small amount of coupling agent, slip agent, heat stabilizer, and other additives to improve the properties of the composition.

The above-mentioned composition may be molded by compression molding with a hot press or cold press; however, usually a hot press, which needs complex operations, is not necessary, because the liquid binder with or without a plasticizer provides strong moldings after compression molding. In other words, for good productivity, the composition of this invention should be molded at room temperature and hardened later at a curing temperature of the thermosetting resin. The moldings obtained in this manner have a good dimensional accuracy and good magnetic properties. The compression molding should be performed at a pressure of 2 to 6 t/cm$^2$. A pressure lower than 2 t/cm$^2$ is not enough to achieve the desired filling density, and a pressure higher than 6 t/cm$^2$ does not increase the filling density any more but breaks the soft magnetic material powder, deteriorating the magnetic properties.

THE BEST MODE FOR CARRYING OUT THE INVENTION

The invention is now described with reference to the following examples, which are not intended to limit the scope of this invention.

The ferrite powder used in Examples and Compaarative Examples was prepared by crushing Mn-Zn ferrite sintered product having an initial permeation of 1000 to 3000. The resulting powder was divided into a fraction of particle diameter 0.6 to 0.8 mm and a fraction of particle diameter 0.1 to 0.35 mm. The two fractions were mixed at a ratio of 70 wt% and 30 wt%.

EXAMPLES 1 TO 7

Ferrite powder (86 vol%) and resol-type phenolic resin (14 vol%) incorporated with a varied amount of plasticizer (polyester of adipic acid) were mixed using a ribbon blender. The amount of the polyester ranged from 0 to 80 parts by weight for 100 parts by weight of solids in the resol-type phenolic resin as shown in Table 1. Each composition thus obtained was molded into a ring shape measuring 30 mm in outside diameter, 20 mm in inside diameter, and 10 mm in height. The resulting molding was easy to handle and free of defects such as chipping and cracking. The molding was cured at 180° C. for 2 hours. The cured molding had a good appearance and shape. Table 1 shows the density and initial permeability of the cured molding.

EXAMPLES 8 AND 9

The same procedure as in Example 4 was repeated except that the polyester of adipic acid (plasticizer) was replaced by 60 parts by weight of polyester of phthalic acid or dibutyl phthalate. The resulting ring-shape molding had a good appearance free of chipping and cracking, as shown in Table 1.

EXAMPLES 10 AND 11

100 parts by weight of novolak-type phenolic resin and 100 parts by weight of aminosilane coupling agent were reacted with each other at normal temperature in 200 parts by weight of methanol. After removal of methanol by evaporation, there was obtained a modified liquid phenolic resin having the terminal silane. Using the thus obtained modified phenolic resin, the same procedure as in Examples 1 and 4 was repeated to yield moldings of good appearance. The results are shown in Table 1.

COMPARATIVE EXAMPLES 1 AND 2

The same procedure as in Example 1 was repeated except that the resol-type phenolic resin was replaced by novolak-type phenolic resin powder. In Comparative Example 1, the molding pressure was 2 t/cm$^2$ and the resulting molding was too weak to evaluate the magnetic properties. In Comparative Example 2, the molding pressure was 6 t/cm$^2$ and the resulting molding was very poor in density and initial permeability.

TABLE 1

| | Binder | Plasticizer (parts by weight) | | Molding pressure (t/cm$^2$) | $\mu i$ | Density (g/cm$^3$) | Appearance & dimensions |
|---|---|---|---|---|---|---|---|
| Example No. | | | | | | | |
| 1 | Liquid resol resin | Polyester of adipic acid | 0 | 4 | 55.8 | 4.029 | good |
| 2 | Liquid resol resin | Polyester of adipic acid | 30 | 4 | 61.0 | 4.126 | good |
| 3 | Liquid resol resin | Polyester of adipic acid | 50 | 4 | 64.3 | 4.163 | good |
| 4 | Liquid resol resin | Polyester of adipic acid | 80 | 4 | 70.8 | 4.190 | good |
| 5 | Liquid resol resin | Polyester of adipic acid | 80 | 2 | 68.1 | 4.175 | good |
| 6 | Liquid resol resin | Polyester of adipic acid | 80 | 3 | 71.7 | 4.187 | good |
| 7 | Liquid resol resin | Polyester of adipic acid | 80 | 5 | 70.6 | 4.212 | good |
| 8 | Liquid resol resin | Polyester of phthalic acid | 60 | 4 | 68.5 | 4.164 | good |
| 9 | Liquid resol resin | Dibutyl phthalate | 60 | 4 | 68.2 | 4.172 | good |
| 10 | Modified novolak resin | Polyester of adipic acid | 0 | 4 | 54.4 | 4.011 | good |
| 11 | Modified novolak resin | Polyester of adipic acid | 80 | 4 | 67.5 | 4.160 | good |
| Comparative Example 1 | Powder novolak resin | none | | 2 | | impossible to mold | |
| Comparative Example 2 | Powder novolak resin | none | | 6 | 49.3 | 4.132 | some chippings |

POSSIBILITY OF USE IN INDUSTRY

As mentioned above, the present invention provides a molding compound and a process for making the molding compound into molded items of high permeability having a high density, high initial permeability, high strength, high dimensional accuracy, and balanced magnetic properties. The molded items can be used for the accurate correction of current-induced magnetic field.

We claim:

1. A soft magnetic material composition consisting essentially of 70 to 95 vol% of particles of spinel ferrite powder, wherein the particles of spinel ferrite powder have a diameter of at least 0.1 mm, and a fraction of said particles have a diameter of at least 0.6 mm, the balance of said composition being a liquid thermosetting resin containing 5 to 100 parts by weight of a plasticizer based on 100 parts by weight of solids of the liquid thermosetting resin.

2. A composition as set foorth in claim 1, wherein the plasticizer is at least one member selected from polyester-based plasticizers and phthalic ester-based plasticizer.

3. A process for molding a plastics containing soft magnetic material composition of high permeability, said process comprising forming a molded article by compression molding at normal temperature a soft magnetic material composition consisting essentially of 70 to 95 vol% of particles of spinel ferrite powder, wherein the particles of spinel ferrite powder have a diameter of at least 0.1 mm, and a fraction of said particles have a diameter of of at least 0.6 mm, the balance of said composition being a liquid thermosetting resin containing 5 to 100 parts by weight of a plasticizer based on 100 parts of solids of the liquid thermosetting resin, and subsequently solidifying the molded article at a curing temperature of the liquid thermosetting resin.

4. A molding process as set forth in claim 3, wherein the compression molding is carried out under a pressure of 2 to 6 t/cm$^2$.

* * * * *